United States Patent
Seo

(10) Patent No.: US 11,654,898 B2
(45) Date of Patent: May 23, 2023

(54) VEHICLE DRIVING CONTROL APPARATUS INCLUDING SOUND SENSOR AND VEHICLE DRIVING CONTROL METHOD USING THE VEHICLE DRIVING CONTROL APPARATUS

(71) Applicant: SAMSUNG ELECTRONICS CO., LTD., Suwon-si (KR)

(72) Inventor: Youngwan Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 16/702,950

(22) Filed: Dec. 4, 2019

(65) Prior Publication Data
US 2020/0238981 A1 Jul. 30, 2020

(30) Foreign Application Priority Data
Jan. 25, 2019 (KR) .................. 10-2019-0010069

(51) Int. Cl.
*B60W 30/09* (2012.01)
*B60Q 9/00* (2006.01)
(Continued)

(52) U.S. Cl.
CPC ............... *B60W 30/09* (2013.01); *B60Q 9/00* (2013.01); *B60W 50/14* (2013.01);
(Continued)

(58) Field of Classification Search
CPC ................. B60W 30/09; B60W 50/14; B60W 2050/146; B60W 2420/54;
(Continued)

(56) References Cited

U.S. PATENT DOCUMENTS 8,676,427 B1    3/2014 Ferguson et al.
9,747,796 B1 *  8/2017 De Beaufort .......... B60Q 9/008
(Continued)

FOREIGN PATENT DOCUMENTS

EP    2 924 673 B1    3/2017
EP    3 279 622 A1    2/2018
(Continued)

OTHER PUBLICATIONS

Communication dated Nov. 2, 2020 by the European Patent Office in counterpart European Patent Application No. 20150215.0.
(Continued)

*Primary Examiner* — Robert T Nguyen
*Assistant Examiner* — Renee LaRose
(74) *Attorney, Agent, or Firm* — Sughrue Mion, PLLC

(57) ABSTRACT

A vehicle driving control apparatus includes a communication interface configured to receive, from a sound sensor, a signal corresponding to sound that is generated in an external environment, and a processor configured to identify a sound object generating the sound, by obtaining a type of the sound object and either one or both of a direction of the sound object and a distance from the sound object to a vehicle including the vehicle driving control apparatus, based on the received signal, and control driving of the vehicle, based on the identified sound object.

25 Claims, 14 Drawing Sheets

(51) Int. Cl.
  *B60W 50/14* (2020.01)
  *G05D 1/02* (2020.01)
  *G10L 25/51* (2013.01)
  *H04R 1/08* (2006.01)
  *H04R 1/32* (2006.01)

(52) U.S. Cl.
  CPC ......... *G05D 1/0231* (2013.01); *G05D 1/0255* (2013.01); *G10L 25/51* (2013.01); *H04R 1/08* (2013.01); *H04R 1/326* (2013.01); *B60W 2050/146* (2013.01); *B60W 2420/54* (2013.01); *H04R 2499/13* (2013.01)

(58) Field of Classification Search
  CPC .......... B60W 30/18009; B60W 40/00; B60W 40/02; B60W 40/10; B60W 30/18163; B60W 30/14; B60W 2520/10; B60Q 9/00; G05D 1/0231; G05D 1/0255; G05D 2201/0213; G10L 25/51; H04R 1/08; H04R 1/326; H04R 2499/13; H04R 2201/401; H04R 1/245; H04R 1/406; H04R 2201/003; H04R 17/02; G08G 1/0965; G08G 1/166; G01S 5/28; G01S 3/801; G01S 3/8036; B60K 35/00; B60Y 2300/18166; B60Y 2300/14
  See application file for complete search history.

(56) References Cited

U.S. PATENT DOCUMENTS

| | | | |
|---|---|---|---|
| 10,141,007 B1* | 11/2018 | Kim | H04R 1/245 |
| 10,446,031 B2 | 10/2019 | Agnew et al. | |
| 2010/0214086 A1 | 8/2010 | Yoshizawa et al. | |
| 2013/0010980 A1* | 1/2013 | Yoshioka | G01S 3/808 381/92 |
| 2015/0051753 A1 | 2/2015 | Kawamata et al. | |
| 2015/0215706 A1 | 7/2015 | Sparks et al. | |
| 2016/0229339 A1* | 8/2016 | Funayama | B60Q 5/006 |
| 2016/0291117 A1* | 10/2016 | Hui | G01S 5/20 |
| 2017/0113684 A1* | 4/2017 | Banvait | B60W 30/09 |
| 2018/0038901 A1* | 2/2018 | Kim | G01H 3/08 |
| 2018/0114445 A1 | 4/2018 | Jang et al. | |
| 2018/0208243 A1 | 7/2018 | Kim et al. | |

FOREIGN PATENT DOCUMENTS

| | | |
|---|---|---|
| JP | 6024741 B2 | 11/2016 |
| KR | 10-1892028 B1 | 8/2018 |
| KR | 10-2018-0105055 A | 9/2018 |

OTHER PUBLICATIONS

Communication dated Jun. 16, 2020 issued by the European Intellectual Property Office in counterpart European Application No. 20150215.0.

* cited by examiner

VEHICLE DRIVING CONTROL APPARATUS INCLUDING SOUND SENSOR AND VEHICLE DRIVING CONTROL METHOD USING THE VEHICLE DRIVING CONTROL APPARATUS

CROSS-REFERENCE TO RELATED APPLICATION

This application is based on and claims priority under 35 U.S.C. § 119 to Korean Patent Application No. 10-2019-0010069, filed on Jan. 25, 2019, in the Korean Intellectual Property Office, the disclosure of which is incorporated by reference herein in its entirety.

BACKGROUND

1. Field

The disclosure relates to vehicle driving control apparatuses using sound sensors and vehicle driving control methods of the vehicle driving control apparatuses.

2. Description of the Related Art

As interest in autonomous vehicles increases, technologies that enable autonomous driving have attracted attention. In order for a vehicle to move itself without a driver's operation, (1) a technique for recognizing the external environment of the vehicle, (2) a technique for synthesizing recognized information, determining an operation such as acceleration, stop, and turning, and determining a driving route, and (3) a technique for controlling the movement of the vehicle by using determined information are used. All the techniques have to be organically combined to accomplish autonomous driving, but the technique for recognizing the external environment of a vehicle is getting more and more important. This is because recognizing the external environment is the first element of autonomous driving, and fusion with electric and electronic technology and information technology is performed to recognize the external environment.

Techniques for recognizing the external environment may be roughly classified into a sensor-based recognition technique and a connection-based recognition technique. Sensors mounted on a vehicle for autonomous driving include ultrasonic sensors, cameras, radars, and lidars. The sensors mounted on a vehicle, either alone or with other sensors, recognize the external environment of the vehicle and topography and provide information to a driver and the vehicle.

SUMMARY

Provided are vehicle driving control apparatuses using sound sensors and vehicle driving control methods of the vehicle driving control apparatuses.

Additional aspects will be set forth in part in the description that follows and, in part, will be apparent from the description, or may be learned by practice of the presented embodiments.

According to embodiments, a vehicle driving control apparatus includes a communication interface configured to receive, from a sound sensor, a signal corresponding to sound that is generated in an external environment; and a processor configured to identify a sound object generating the sound, by obtaining a type of the sound object and either one or both of a direction of the sound object and a distance from the sound object to a vehicle including the vehicle driving control apparatus, based on the received signal, and control driving of the vehicle, based on the identified sound object.

The processor may be further configured to change either one or both of a driving route of the vehicle and a speed of the vehicle, based on the identified sound object.

The processor may be further configured to control the driving of the vehicle to prevent a collision between the vehicle and the identified sound object.

The vehicle driving control apparatus may further include an output interface configured to output information of any one or any combination of the type of the sound object, the direction of the sound object, and the distance from the sound object to the vehicle.

The output interface may include a display configured to display an image related to the external environment, the image including the information of the type of the sound object.

The display may be further configured to display, on the displayed image, a relative position of the sound object with respect to the vehicle.

The sound sensor may be mounted on the vehicle.

The sound sensor may include a plurality of vibrators arranged in different directions and having different resonance bands, and at least two among the plurality of vibrators may be configured to vibrate in response to the sound.

Any one or any combination of the plurality of vibrators may be arranged in parallel with a driving direction of the vehicle.

The processor may be further configured to obtain a frequency band of the sound, based on a resonance frequency of a vibrating vibrator among the at least two among the plurality of vibrators, obtain the type of the sound object, based on the obtained frequency band of the sound, obtain the direction of the sound object relative to the vehicle, based on a direction of the vibrating vibrator, obtain and the distance from the sound object to the vehicle, based on an output intensity of the vibrating vibrator, and obtain a change in the distance from the sound object to the vehicle, based on a time-dependent variation of the output intensity of the vibrating vibrator.

The sound object may be not identified by an optical sensor mounted on the vehicle.

The sound object may be in an area other than a line of sight of the optical sensor, in the external environment of the vehicle.

The optical sensor may include an image sensor.

The processor may be further configured to obtain one or more candidate sound objects potentially generating the sound, based on a result that is output from the sound sensor, and identify, as the sound object, one among the one or more candidate sound objects that is not identified by the optical sensor.

According to embodiments, a method of controlling driving of a vehicle includes receiving, from a sound sensor, a signal corresponding to sound that is generated in an external environment, identifying a sound object generating the sound, by obtaining a type of the sound object and either one or both of a direction of the sound object and a distance from the sound object to the vehicle, based on the received signal, and controlling driving of the vehicle, based on the identified sound object.

The controlling of the driving of the vehicle may include changing any one or any combination of a driving route of the vehicle and a speed of the vehicle, based on the identified sound object.

The controlling of the driving of the vehicle may include controlling the driving of the vehicle such that the vehicle and the identified sound object do not collide with each other.

The method may further include outputting information of any one or any combination of the type of the sound object, the direction of the sound object, and the distance from the sound object to the vehicle.

The outputting may include displaying an image related to the external environment, the image including the information of the type of the sound object.

The displaying of the image may include displaying, on the displayed image, a relative position of the sound object with respect to the vehicle.

The sound object may be not identified by an optical sensor mounted on the vehicle.

The sound object may be in an area other than a line of sight of the optical sensor, in the external environment of the vehicle.

The identifying of the sound object may include obtaining one or more candidate sound objects potentially generating the sound, based on a result that is output from the sound sensor, and identifying, as the sound object, one among the one or more candidate sound objects that is not identified by the optical sensor.

The sound sensor may be mounted on the vehicle and includes a plurality of vibrators arranged in different directions and having different resonance bands, and at least two among the plurality of vibrators may be configured to vibrate in response to the sound.

The identifying of the sound object may include obtaining a frequency band of the sound, based on a resonance frequency of a vibrating vibrator among the at least two among the plurality of vibrators, obtaining the type of the sound object, based on the obtained frequency band of the sound, obtaining the direction of the sound object relative to the vehicle, based on a direction of the vibrating vibrator, obtaining the distance from the sound object to the vehicle, based on an output intensity of the vibrating vibrator, and obtaining a change in the distance from the sound object to the vehicle, based on a time-dependent variation of the output intensity of the vibrating vibrator.

The identifying of the sound object may include obtaining, based on a result that is output from the sound sensor, at least one among the plurality of vibrators having an intensity change equal to or greater than a reference range, and identifying the sound object, based on a result that is output from the obtained at least one among the plurality of vibrators.

According to embodiments, a vehicle driving control apparatus of a vehicle, includes a sound sensor configured to obtain a signal corresponding to sound that is generated by a sound object in an external environment, and a processor configured to obtain a type of the sound object, a direction of the sound object and a distance between the sound object and the vehicle, based on the received signal, and control driving of the vehicle, based on the obtained type of the sound object, the obtained direction of the sound object and the obtained distance.

The sound sensor may include a sound inlet, a plurality of vibrators disposed on a same plane as the sound inlet and disposed to surround the sound inlet, the plurality of vibrators configured to vibrate in response to the sound, and a plurality of sound outlets disposed to face the plurality of vibrators.

Each of the plurality of vibrators may include a fixed portion fixed to a support of the sound sensor, a moving portion configured to move in response to the sound, a sensing portion on which the moving portion is disposed, the sensing portion configured to sense a movement of the moving portion, and a mass body disposed on the moving portion.

The plurality of vibrators may be respectively arranged in subgroups, and in each of the subgroups, lengths of the plurality of vibrators may gradually increase in a clockwise or counterclockwise direction.

BRIEF DESCRIPTION OF THE DRAWINGS

The above and other aspects and features of embodiments of the disclosure will be more apparent from the following description taken in conjunction with the accompanying drawings, in which.

DETAILED DESCRIPTION

Figure 1:
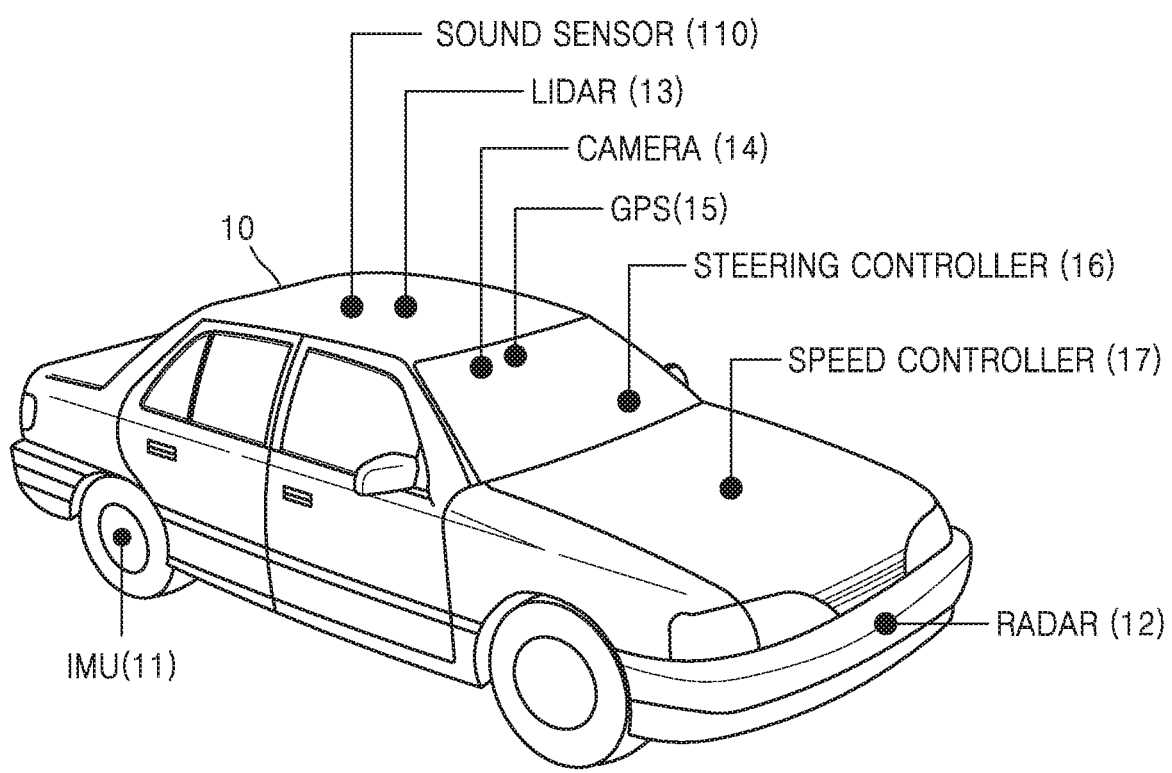
FIG. 1 is a diagram illustrating an autonomous vehicle according to embodiments.

The disclosure will now be described more fully with reference to the accompanying drawings, in which embodiments of the disclosure are shown. In the drawings, widths and thicknesses of layers or areas may be exaggerated for clarity and convenience of explanation. Like reference numerals denote like elements in the drawings.

It will be understood that the terms "comprise" or "include" may not be construed as including all elements or steps described in the specification and may omit some elements or some steps or may further include additional elements or steps.

Also, the terms such as " . . . unit" or " . . . module" refer to units that perform at least one function or operation, and the units may be implemented as hardware or software or as a combination of hardware and software.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an autonomous vehicle 10 according to embodiments.

The vehicle 10 supporting autonomous driving may include various sensors, for example, an inertial measurement unit (IMU) 11 for measuring vehicle speed, vehicle direction, gravity, acceleration, and the like, a radar 12 for emitting an electromagnetic wave and recognizing a situation through a reflected pattern, a lidar 13 for emitting a low power laser and recognizing a surrounding situation through a reflected pattern, and a camera 14 for capturing an image. A vehicle driving control apparatus 100 (see FIG. 3) may receive sensing data from sensors mounted on the vehicle 10. The vehicle 10 may be controlled by a driver 120 (see FIG. 3) such as a steering controller 16 and/or a speed controller 17 based on information received from various sensors.

The vehicle driving control apparatus 100, which is an apparatus for controlling the driving of a vehicle, may be mounted on the vehicle 10 as a separate device distinguished from the vehicle 10, may be included in the vehicle 10, or may be at least a portion of an electronic device that controls the vehicle 10. The vehicle driving control apparatus 100 may include any one or any combination of the sensors shown in FIG. 1, for example, the radar 12, the lidar 13, the camera 14, and a global positioning system (GPS) 15, and may include at least portions of the steering controller 16 and the speed controller 17.

Furthermore, the vehicle driving control apparatus 100 may store map data including precise road information of an area where the vehicle 10 will travel. The vehicle driving control apparatus 100 may control the speed and/or the direction of the vehicle 10 by driving an artificial intelligence program using a high-speed GPU and analyzing information and road information inputted from the sensors.

The vehicle driving control apparatus 100 according to embodiments may further include a sound sensor 110 for sensing sounds generated in an external environment. Sensors such as the radar 12, the lidar 13, and the camera 14 may recognize only a situation in an area within a line of sight of the external environment. In addition, sensors such as the GPS 15 and the IMU 11 may recognize a situation in an area other than the line of sight, but has a difficulty in recognizing an external environment in real time. The sound sensor 110 may immediately detect the generation of sound regardless of the line of sight.

Figure 2:
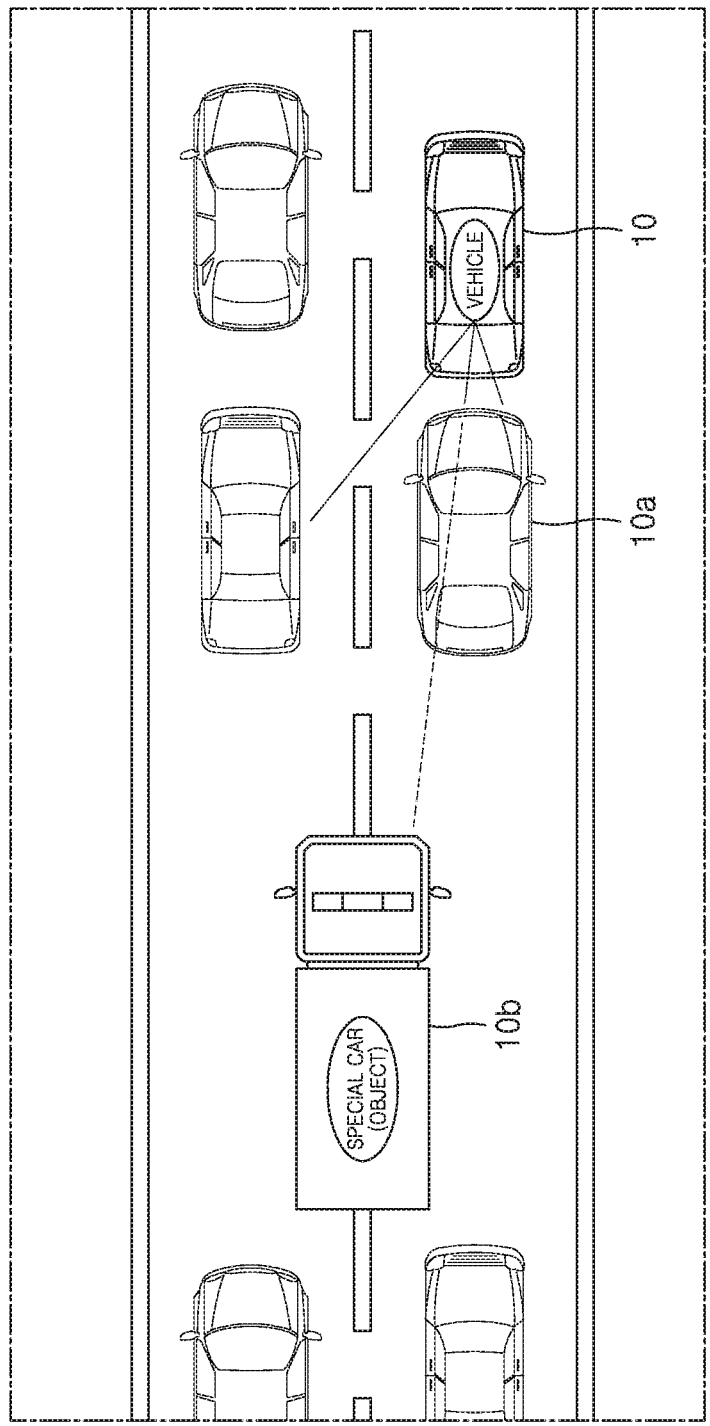
FIG. 2 is a reference diagram illustrating an object in an area other than a line of sight, according to embodiments.

FIG. 2 is a reference diagram illustrating an object in an area other than a line of sight, according to embodiments. As shown in FIG. 2, an object 10a in an area adjacent to a vehicle 10, that is, in a line of sight area, in an external environment may be identified by a sensor such as a radar, a lidar, or a camera. However, an object 10b that is not adjacent to the vehicle 10 may be present in an area other than the line of sight due to the object 10a adjacent to the vehicle 10. Even if the object 10b is present in an area other than the line of sight, the object 10b may be an object that affects the running of a vehicle such as an ambulance. Thus, a vehicle driving control apparatus recognizes the object 10b in real time. Because the sound sensor 110 (see FIG. 3) according to embodiments senses sound, the sound sensor 110 may be used to recognize an object that generates sound, regardless of the line of sight.

Figure 3:
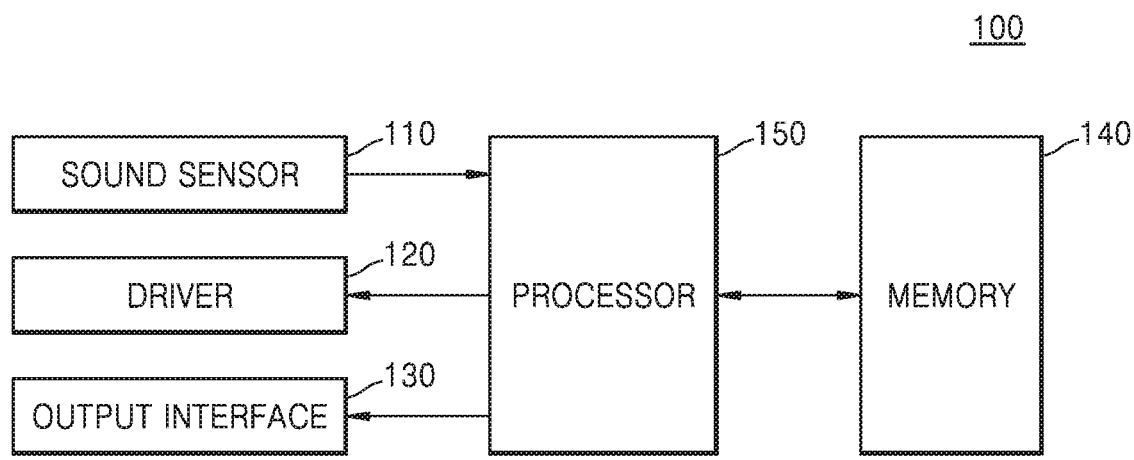
FIG. 3 is a block diagram of a vehicle driving control apparatus including a sound sensor, according to embodiments.

FIG. 3 is a block diagram of the vehicle driving control apparatus 100 including the sound sensor 110, according to embodiments. Referring to FIG. 3, the vehicle driving control apparatus 100 may include the sound sensor 110 for detecting sound, the driver 120 for driving a vehicle, an output interface 130 for outputting information related to the driving of the vehicle, a memory 140 for storing data related to the driving of the vehicle, and a processor 150 for controlling the driving of the vehicle based on a result detected by the sound sensor 110. Although the vehicle driving control apparatus 100 is shown as including one processor, the embodiments are not limited thereto and the vehicle driving control apparatus 100 may include a plurality of processors. Hereinafter, at least some of the operations and functions of the processor 150 may be performed by a plurality of processors.

The sound sensor 110 may include a plurality of vibrators arranged in different directions and may detect sounds by vibrating one or more vibrators arranged in a direction corresponding to the direction in which the sounds are generated. The sound sensor 110 may be mounted on the vehicle, for example, mounted outside the vehicle. The vibrators of the sound sensor 110 may be arranged parallel to the driving direction of the vehicle.

Figure 4:
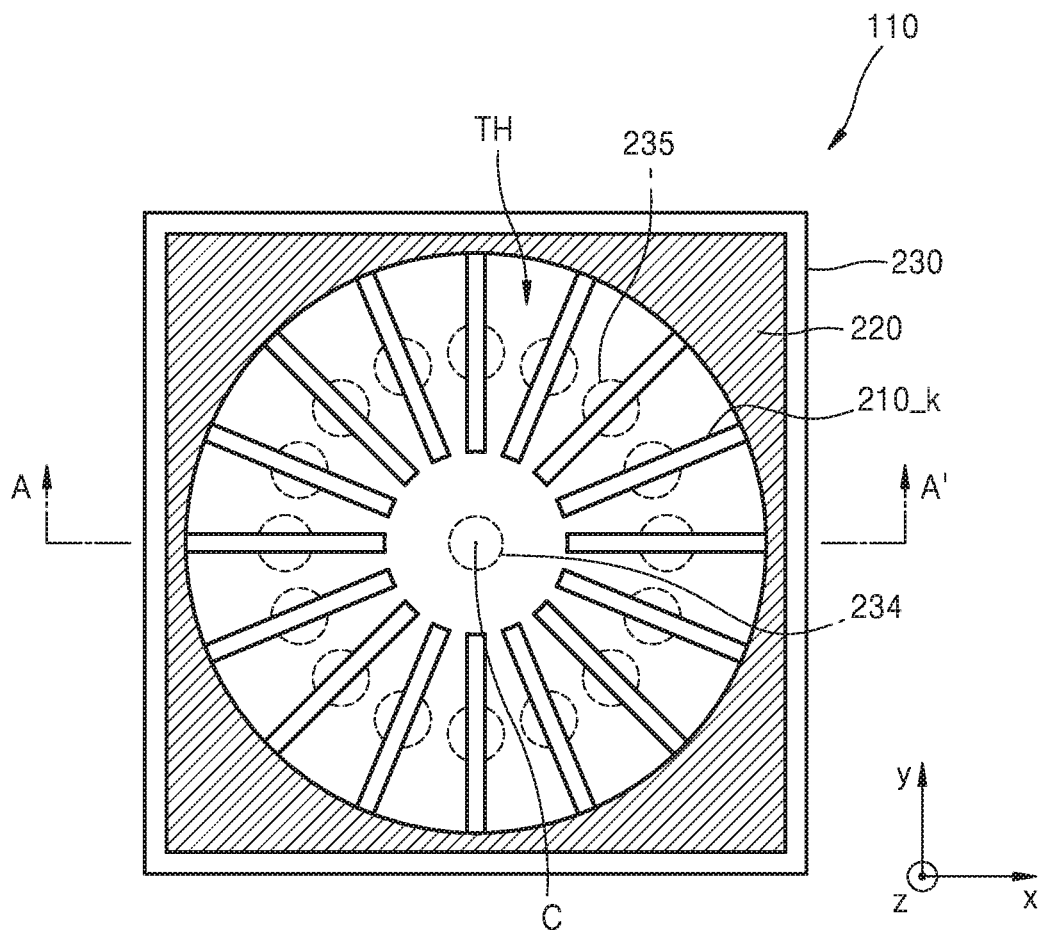
FIG. 4 is a plan view of a schematic structure of a sound sensor according to embodiments.
Figure 5:
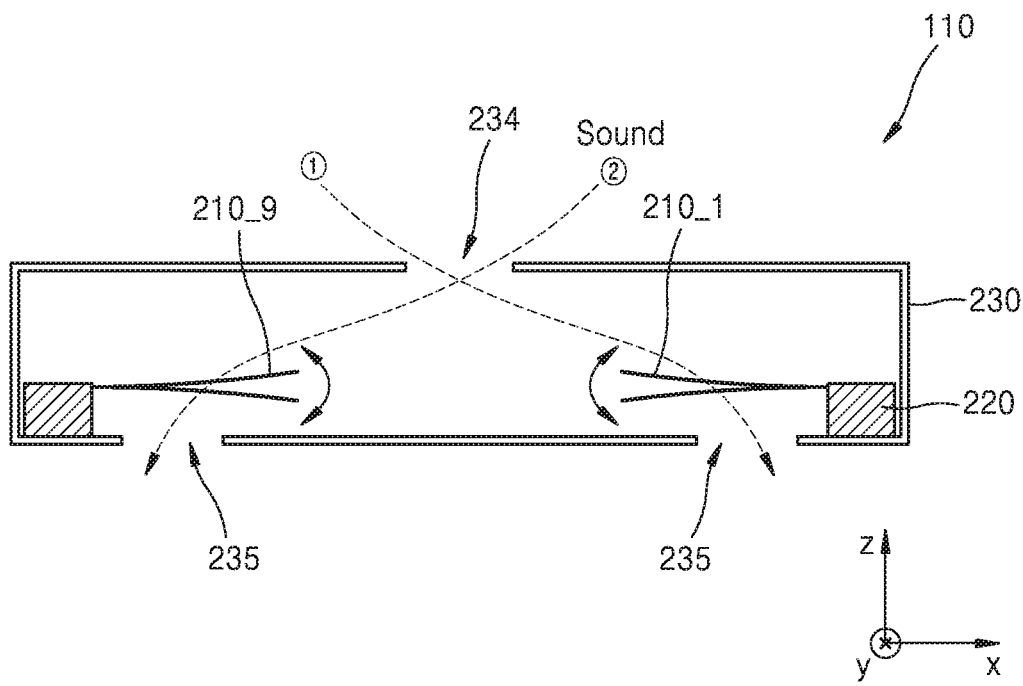
FIG. 5 is a cross-sectional view taken along line A-A' of the sound sensor of FIG. 4.
Figure 6A:
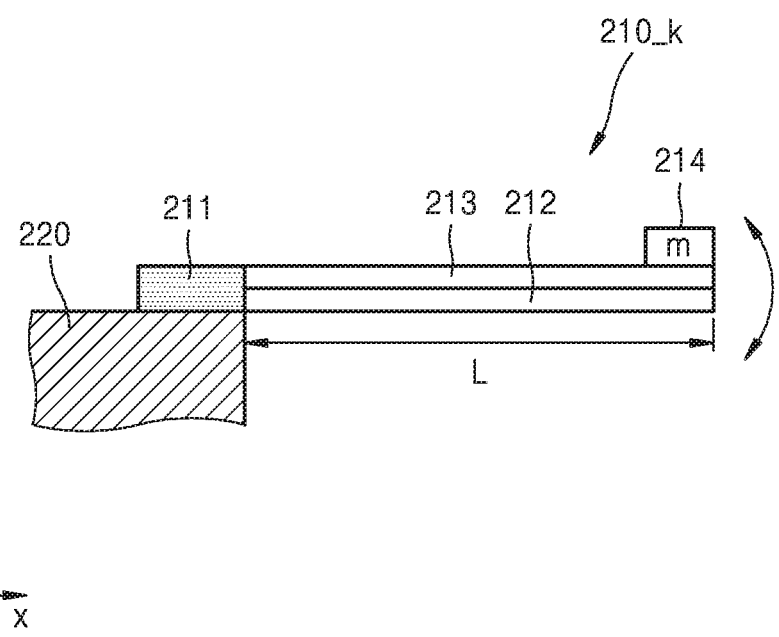
FIGS. 6A and 6B are cross-sectional views illustrating structures of one vibrator provided in the sound sensor of FIG. 4 in different cross-sections, respectively.
Figure 6B:
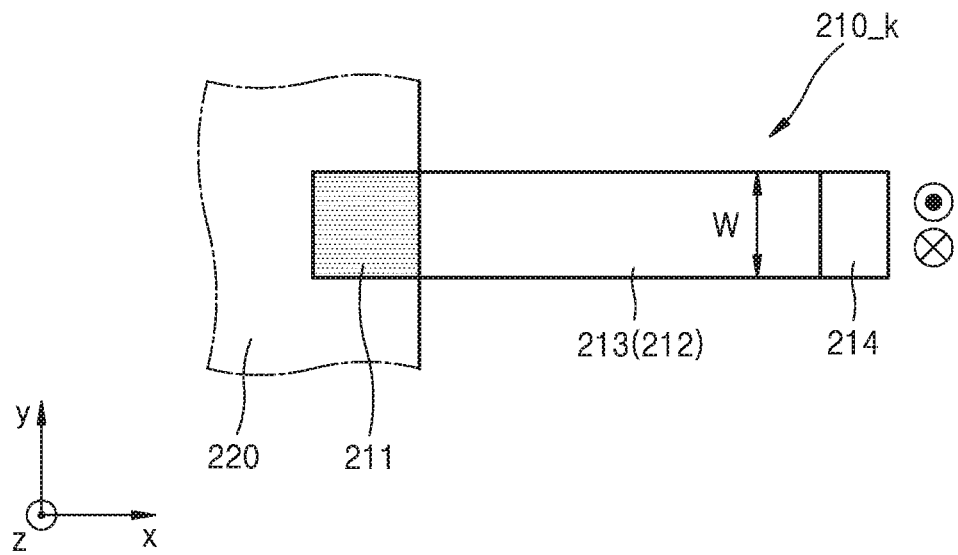

FIG. 4 is a plan view of a schematic structure of the sound sensor 110 according to embodiments, and FIG. 5 is a cross-sectional view taken along line A-A' of the sound sensor 110 of FIG. 4. FIGS. 6A and 6B are cross-sectional views illustrating structures of one vibrator provided in the sound sensor 110 of FIG. 4 in different cross-sections, respectively.

Referring to FIGS. 4 and 5, the sound sensor 210 may include an sound inlet 234 through which sound is input, an sound outlet 235 through which the sound input through the sound inlet 234 is output, and a plurality of vibrators 210_$k$ arranged between the sound inlet 234 and the sound outlet 235. Here, when the number of vibrators 210_$k$ is N, k is an integer from 1 to N.

A physical angular resolution of the sound sensor 210 may be determined by the number N of vibrators 210_$k$. The physical angular resolution may be expressed as 360°/N. The sound sensor 210 may detect the direction of an input sound by comparing the output sizes of the plurality of vibrators 210_$k$. As the number of vibrators 210_$k$ to be compared with each other increases, higher resolution may be obtained.

The plurality of vibrators 210_$k$ are arranged such that any one or any combination of them selectively reacts according to the direction of a sound input to the sound inlet 234. The plurality of vibrators 210_$k$ may be arranged to surround the sound inlet 234. The plurality of vibrators 210_$k$ may be arranged in a planar manner without overlapping each other, and all of the plurality of vibrators 210_$k$ may be arranged to be exposed to the sound inlet 234. As shown in FIG. 4, the plurality of vibrators 210_$k$ may be arranged on the same plane and may be arranged to surround a center point C on the same plane facing vertically to the center of the sound inlet 234. In the drawings, the plurality of vibrators 210_$k$ are shown as surrounding the center point C in a circular shape, but this is only an example. The arrangement of the plurality of vibrators 210_$k$ is not limited thereto and may be arranged in various forms having symmetry with respect to the center point C. For example, the plurality of vibrators 210_k may be arranged in a shape of a polygonal or elliptical trajectory.

A plurality of sound outlets 235 may be arranged to face the plurality of vibrators 210_k.

The sizes and shapes of the sound inlet 234 and the sound outlet 235 are not particularly limited, and the sound inlet 234 and the sound outlet 235 may have any sizes and shapes capable of exposing the plurality of vibrators 210_k to the same extent.

A case 230 having openings corresponding to the shapes of the sound inlet 234 and the sound outlet 235 may be used to form the sound inlet 234 and the sound outlet 235.

The case 230 may include one of various materials capable of shielding sounds. For example, the case 230 may include a material such as aluminum. The sound inlet 234 and the sound outlet 235 are not limited to the shapes illustrated in FIGS. 4 and 5.

A support 220 supporting the plurality of vibrators 210_k and providing a space in which the plurality of vibrators 210_k vibrate in response to sound may be located in the case 230. The support 220 may be formed by forming a through hole TH in a substrate, as shown in FIG. 4. The plurality of vibrators 210_k may be supported by the support 220 and may be arranged to face the through holes TH. The through hole TH provides a space in which the vibrators 210_k vibrate by an external force, and the shape and size of the through hole TH are not particularly limited as long as the through hole TH provides the space. The support 220 may include one of various materials such as a silicon substrate.

As shown in FIGS. 6A and 6B, each of the vibrators 210_k includes a fixed portion 211 fixed to the support 220, a moving portion 213 movable in response to a signal, and a sensing portion 212 for sensing the movement of the moving portion 213. The vibrator 210_k may further include a mass body 214 for providing a mass m to the moving portion 213.

The moving portion 213 may include an elastic film. The elastic film may have a length L and a width W and determines resonance characteristics of the vibrator 210_k along with the mass m of the mass body 214. The elastic film may include a material such as silicon, metal, or polymer.

The sensing portion 212 may include a sensor layer for sensing the movement of the moving portion 213. The sensing portion 212 may include, for example, a piezoelectric element, and in this case, the sensing portion 212 may have a structure in which an electrode layer, a piezoelectric material layer, and an electrode layer are stacked. The piezoelectric material layer may include ZnO, SnO, PZT, $ZnSnO_3$, polyvinylidene fluoride (PVDF), poly(vinylidene fluoride-trifluoroethylene) (P(VDF-TrFE)), AlN, or PMN-PT. The electrode layers may include a metal material or any of various conductive materials.

Concrete values of the width and thickness of the vibrator 210_k may be determined in consideration of a desired resonance frequency for the vibrator 210_k. For example, the vibrator 210_k may have a width of approximately several micrometers to several hundreds of micrometers, a thickness of approximately several micrometers or less, and a length of approximately several millimeters or less, but is not limited thereto. The vibrator 210_k having such a small size may be manufactured by a Micro Electro Mechanical System (MEMS) process.

The vibrator 210_k vibrates up and down in the Z direction in response to an external signal and exhibits an output proportional to a displacement z. The displacement z satisfies the equation of motion according to Equation 1 below.

$$m\frac{d^2z}{dt^2} + c\frac{dz}{dt} + kz = F_0 \cos \omega t \qquad [\text{Equation 1}]$$

Here, c is a damping coefficient, k is a modulus of elasticity, and $F_0 \cos \omega t$ is a driving force, which indicates an action due to a signal input to the vibrator 210_k. The value of k is determined by the physical properties and shape of the moving portion 213.

The vibrator 210_k exhibits a frequency response characteristic having a bandwidth around a resonance frequency $f_0$.

The resonance frequency $f_0$ that is a center frequency is represented by Equation 2 below.

$$f_o = \frac{1}{2\pi}\sqrt{\frac{k}{m}} \qquad [\text{Equation 2}]$$

Thus, the vibrator 210_k provided in the sound sensor 210 may sense a frequency band around a designed center frequency. Therefore, in designing the center frequency, a frequency band with high usability in a given environment may be set and the vibrator 210_k may be realized with a shape and physical properties, which are suitable for the set frequency band.

In the sound sensor 210, the vibrators 210_k provided at the respective positions are set to have the same length to have the same resonance frequency. However, is the embodiments are not limited thereto and the vibrators 210_k may be modified to have different resonance frequencies.

In the sound sensor 210, one or more vibrators 210_k placed in a path to which a directional sound is input, among the plurality of vibrators 210_k, vibrates in response to the directional sound. For example, as shown in FIG. 5, when sound is input to a path ①, one or more vibrators including a vibrator 210_1 placed on the path ① may vibrate. When sound is input to a path ②, one or more vibrators including a vibrator 210_9 placed on the path ② may vibrate. Thus, the direction of an input sound may be determined from the position and output of the vibrator 210_k selectively responding according to the direction of the input sound.

Figure 7:
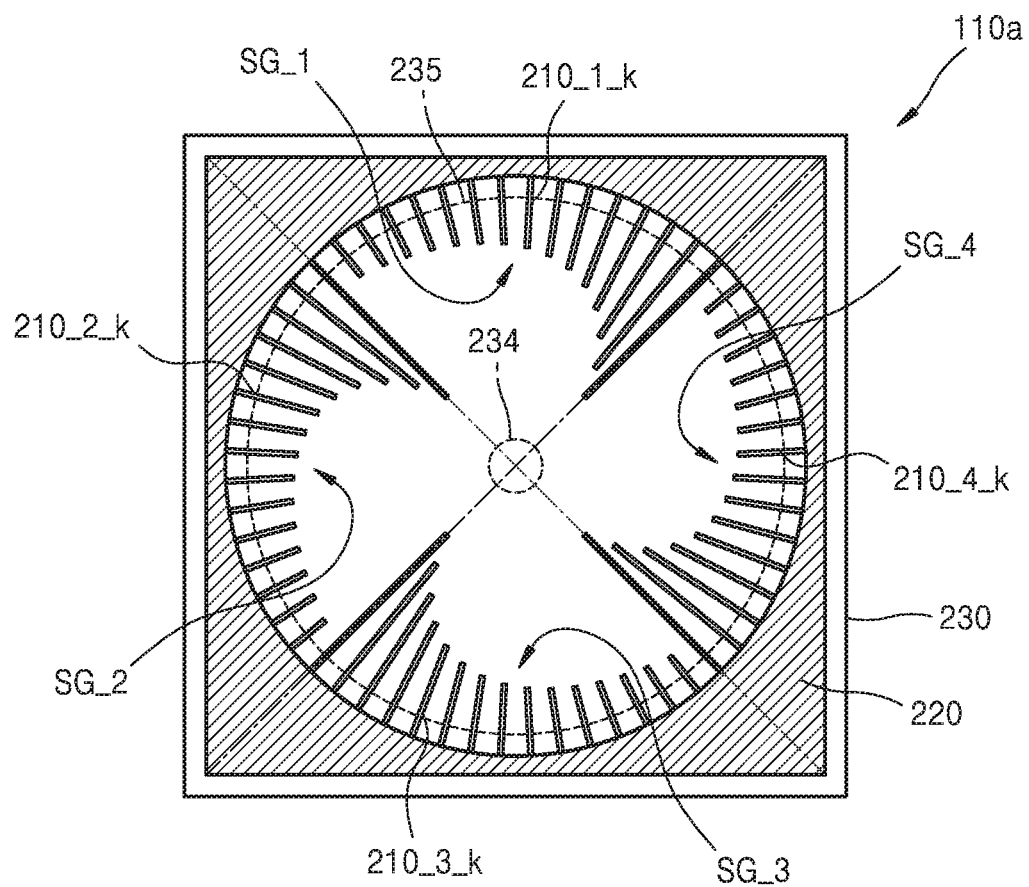
FIG. 7 is a plan view of a schematic structure of a sound sensor according to embodiments.

FIG. 7 is a plan view of a schematic structure of a sound sensor 110a according to embodiments.

The sound sensor 110a includes a plurality of subgroups, i.e., first to fourth subgroups SG_1, SG_2, SG_3, and SG_4. The first to fourth subgroups SG_1, SG_2, SG_3, and SG_4 may be formed by grouping a number of vibrators whose orientations are adjacent to each other, to represent different directivities. For example, the first to fourth subgroups SG_1, SG_2, SG_3, and SG_4 may represent directions that form an angle of 90° with each other.

The sound sensor 110a is different from the sound sensor 110 in that the sound sensor 110a includes vibrators 210_1_k, 210_2_k, 210_3_k, and 210_4_k, which have different resonance frequencies. For example, as shown in FIG. 7, the sound sensor 110a includes subgroups varying in length to have a range of frequencies, instead of including 64 vibrators having one resonance frequency, and thus, signals of vibrators in one subgroup may be integrated to use the signals. As shown in FIG. 7, by implementing the sound sensor 110a with a device having four subgroups, physical 4 orientations may be provided instead of 64 orientations and a frequency band in each subgroup may be widened to the entire audible band instead of a single resonance band.

Hereinafter, differences will be mainly described.

The first subgroup SG_1 includes a plurality of vibrators 210_1_k arranged along the circumference of a first circular sector with a central angle of 90°, the second subgroup SG_2 includes a plurality of vibrators 210_2_k arranged along the circumference of a second circular sector with a central angle of 90°, the second circular sector being adjacent to the first circular sector, the third subgroup SG_3 includes a plurality of vibrators 210_3_k arranged along the circumference of a third circular sector with central angle of 90°, the third circular sector being adjacent to the second circular sector, and a fourth subgroup SG_4 includes a plurality of vibrators 210_4_k arranged along the circumference of a fourth circular sector with central angle of 90°, the fourth circular sector being adjacent to the third circular sector.

Vibrators 210_i_k (where k is an integer from 1 to N) included in each of subgroups SG_i (where i is an integer from 1 to 4) are set to have respective resonance frequencies to detect sound of a frequency range Δf. An interval between the resonance frequencies of adjacent vibrators 210_i_k may be determined by considering the number N of vibrators 210_i_k included in each of the subgroups SG_i and the frequency range Δf.

The vibrators 210_i_k in each of the subgroups SG_i may be arranged in the order of magnitude of their resonance frequencies. Also, arrangement directions according to the order of magnitude may be the same in the subgroups SG_i. For example, as shown in FIG. 7, in each of the subgroups SG_i, the vibrators 210_i_k may be arranged in the order of the lengths of the vibrators 210_i_k gradually increasing in a clockwise direction. However, the embodiments are not limited thereto and the vibrators 210_i_k may be arranged in the order of the lengths of the vibrators 210_i_k gradually increasing in a counterclockwise direction. Alternatively, in some subgroups SG_i, the vibrators 210_i_k may be arranged in the order of the lengths of the vibrators 210_i_k gradually increasing in the clockwise direction, and in some other subgroups SG_j (where j≠i), the vibrators 210_i_k may be arranged in the order of the lengths of the vibrators 210_i_k gradually increasing in the clockwise direction Relatively accurate direction sensing is possible with four vibrators arranged to distinguish all directions by using four directivities. In consideration of this, the sound sensor 110a may accurately detect the direction of an input sound. In addition, as the sound sensor 110a uses vibrators 210_i_k having different resonance frequencies, the sound sensor 110a may detect a signal of a broader band than the sound sensors including vibrators 210_i_k having the same resonance frequency.

In FIG. 7, sound sensors of a plurality of subgroups are arranged in one housing. However, the embodiments are not limited thereto. Some of the plurality of subgroups may be formed in different housings. For example, the first subgroup SG_1 and the second subgroup SG_2 may be formed in one housing, and the third subgroup SG_3 and the fourth subgroup SG_4 may be formed in another housing. Thus, the first subgroup SG_1 and the second subgroup SG_2 may be mounted in the front of a vehicle, and the third subgroup SG_3 and the fourth subgroup SG_4 may be mounted in the rear of the vehicle. A processor may easily identify a direction from the mounting position of a sound sensor.

Figure 8:
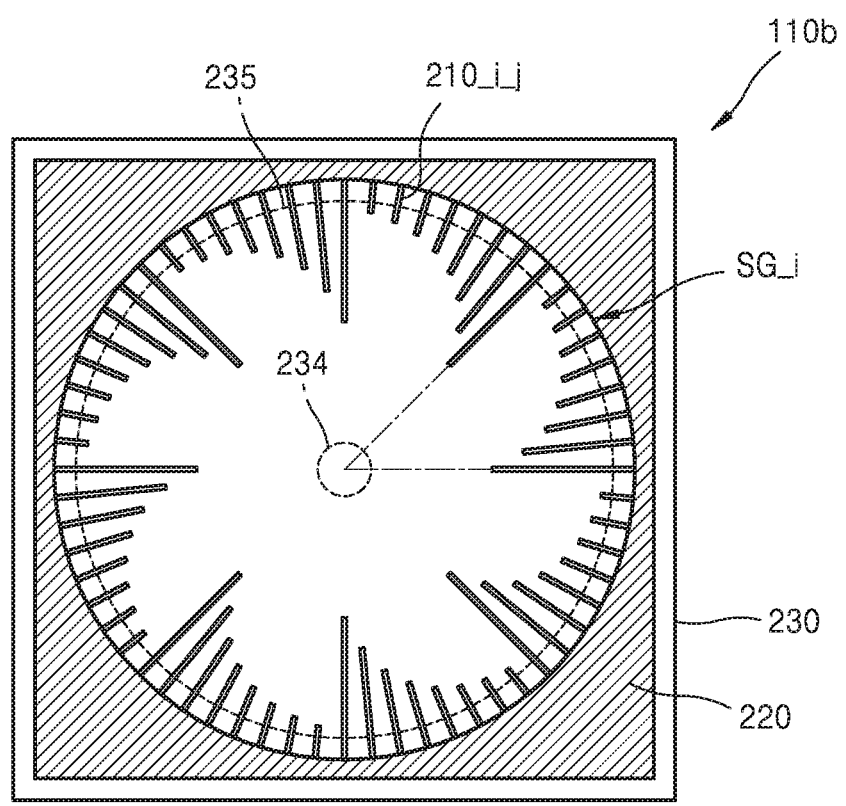
FIG. 8 is a plan view of a schematic structure of a sound sensor according to embodiments.

FIG. 8 is a plan view of a schematic structure of a sound sensor 110b according to embodiments.

The sound sensor 110b differs from the sound sensor 110a of FIG. 7 in that the sound sensor 110b includes 8 subgroups, and the remaining configuration of the sound sensor 110b is substantially the same as that of the sound sensor 110a.

The sound sensor 110b is set such that eight subgroups SG_i (where i is an integer from 1 to 8) may represent directions that form an angle of 45° with each other. Vibrators 210_i_j having different resonance frequencies are arranged in each of the subgroups SG_i.

The sound sensor 110b may have a higher angular resolution than the sound sensor 110a of FIG. 7, but a frequency bandwidth that may be sensed by the sound sensor 110b may be narrowed. With this in mind, the number of subgroups may be set to suit an environment in which the sound sensor 110b will be used.

Figure 9:
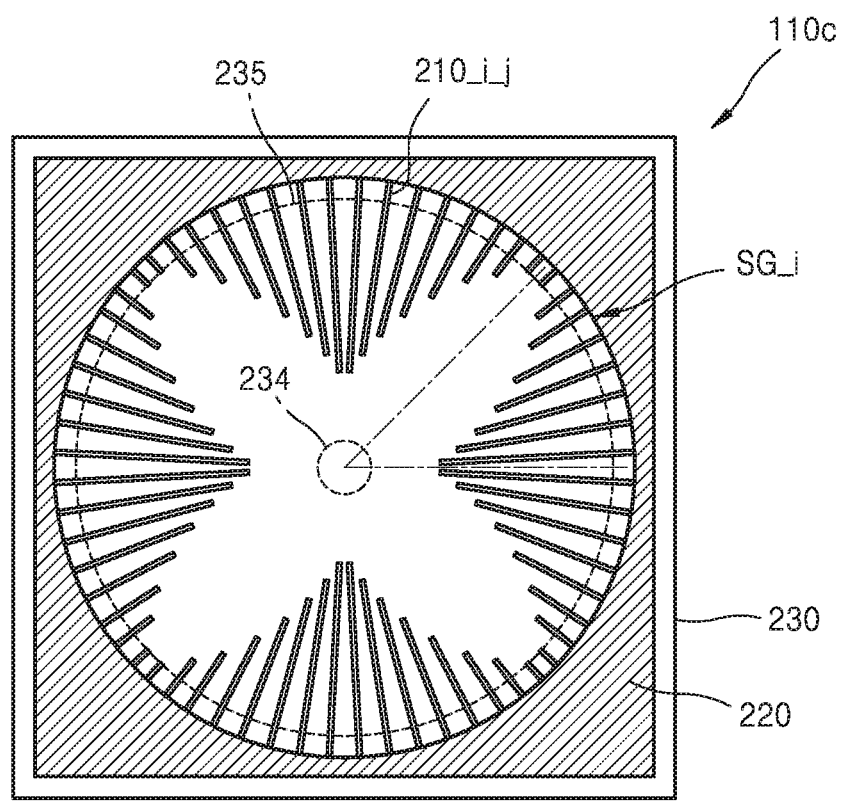
FIG. 9 is a plan view of a schematic structure of a sound sensor according to embodiments.

FIG. 9 is a plan view of a schematic structure of a sound sensor 110c according to embodiments.

The sound sensor 110c differs from the sound sensor 110b of FIG. 8 in that the arrangement orders of a plurality of vibrators 210_i_j in adjacent subgroups SG_i (where i is an integer from 1 to 8) of the sound sensor 110c are in a reverse order. That is, in some subgroups, for example, subgroups SG_1, SG_3, SG_5, and SG_7, the vibrators 210_i_j may be arranged in the order of the lengths increasing in the clockwise direction, and in the remaining subgroups SG_2, SG_4, SG_6, and SG_8, the vibrators 210_i_j may be arranged in the order of the lengths increasing in the counterclockwise direction.

In the description of the sound sensors 110a, 110b, and 110c including vibrators having different resonance frequencies, some examples of vibrator arrangement have been described. However, the vibrator arrangement is not limited thereto. An arrangement interval of vibrators in each subgroup, for example, a frequency interval or a space interval, may not be the same, and for example, various arrangements considering the coupling between adjacent vibrators may be used.

The processor 150 of FIG. 3 may control the driving of a vehicle based on results received from the sound sensor 110.

Figure 10:
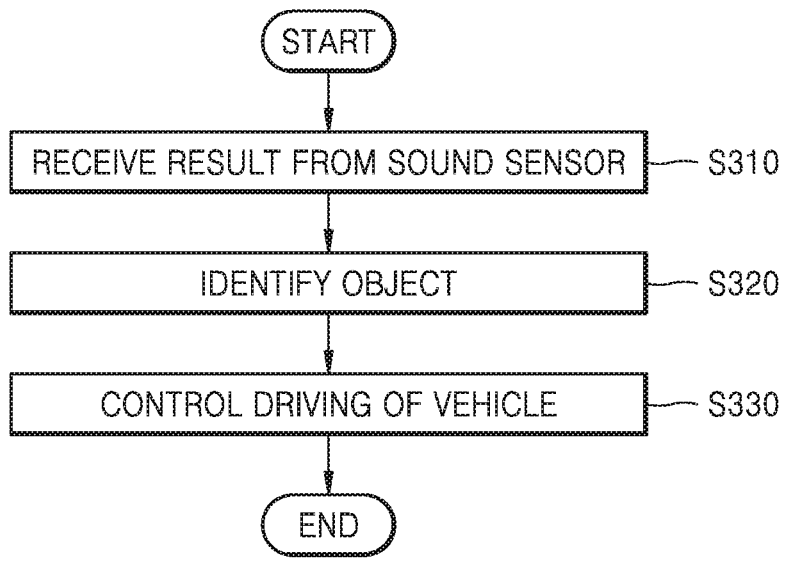
FIG. 10 is a flowchart illustrating a method of controlling the driving of a vehicle using a sound sensor, according to embodiments.

FIG. 10 is a flowchart illustrating a method of controlling the driving of a vehicle using the sound sensor 110, according to embodiments. Referring to FIG. 10, the processor 150 receives a result from the sound sensor 110 (Operation S310). As described above, the sound sensor 110 may include a plurality of vibrators arranged in different directions, and the plurality of vibrators may have different resonance frequencies. Each vibrator of the sound sensor 110 may output an electrical signal corresponding to an input sound. In the sound sensor 110, a vibrator having a resonance frequency included in the frequency of the input sound may vibrate to output an electrical signal (for example, a voltage), and a vibrator having a resonance frequency not included in the frequency of the input sound may not output an electrical signal. Accordingly, the sound sensor 110 may output an electrical signal subdivided by frequency.

The processor 150 may identify an object by using an electrical signal received from the sound sensor 110 (Operation S320). For example, the processor 150 may obtain a sound pattern by using the electrical signal received from the sound sensor 110. The sound pattern may include sound characteristic values that may identify sounds. The processor 150 may obtain sound characteristic values by using fast Fourier transform (FFT), 2-dimensional discrete cosine transform (DCT), dynamic time warping (DTW), artificial neural network, vector quantization (VQ), Gaussian mixture model (GMM), and the like, based on the electrical signal received from the sound sensor 110 and may obtain a sound pattern from the sound characteristic values. In addition, the processor 150 may identify whether a detected sound is the sound of which object by comparing the detected sound to an object template defining the sound of an object. A plurality of object templates may be provided. For example, the plurality of object templates may include an object template corresponding to a sound generated by an ambulance, an object template corresponding to a sound generated by a sudden break of a vehicle, an object template corresponding to a sound generated by a shriek, an object template corresponding to a sound generated by the floor of a vehicle, and the like.

The processor 150 may compare a sound pattern with an object template to determine similarity. The similarity may be determined by a maximum likelihood estimation method or the like. When the similarity is greater than a reference value, the processor 150 may determine that a detected sound includes the sound of an object corresponding to the object template. For example, when a sound pattern is compared with a plurality of object templates and it is determined that the similarity is equal to or greater than the reference value, the processor 150 may determine that the detected sound is generated from a plurality of objects. Hereinafter, an object generating a sound may be referred to as a sound object.

The processor 150 may control the driving of a vehicle in response to the identified object (Operation S330). The processor 150 may control the driver 120 such that either one or both of a driving route and a driving speed of the vehicle is changed corresponding to the identified object. In the memory 140, a vehicle control manual matched to the object may be previously stored. The processor 150 may read the vehicle control manual matched to the object from the memory 140 to control the driving of the vehicle. However, the embodiments are not limited thereto. The processor 150 may use a learning network model of an artificial intelligence (AI) system to control the driving of a vehicle corresponding to an object. For example, the processor 150 may control the driving of a vehicle to prevent collision between an identified object and the vehicle.

The sound sensor 110 may be configured to include at least a part of the processor 150 described below. For example, the sound sensor 110 may perform operations such as correcting an electrical signal for a sound, calculating the characteristics of the electrical signal, and the like, in addition to detecting a sound. In this case, the sound sensor 110 may be a functional module having a hardware module and a software module.

Figure 11:
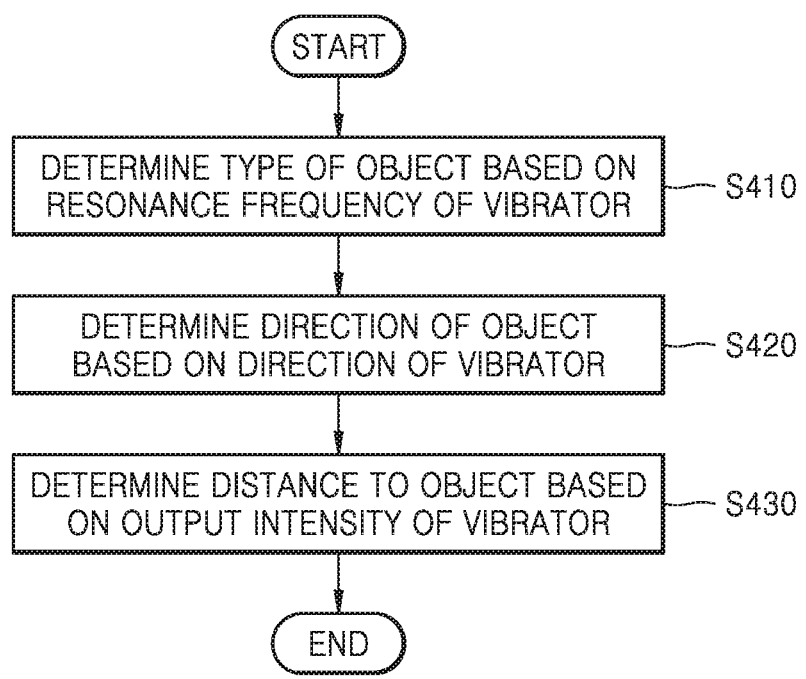
FIG. 11 is a flowchart illustrating a method of identifying an object by using a sound sensor, according to embodiments.

FIG. 11 is a flowchart illustrating a method of identifying an object by using a sound sensor, according to embodiments. The identification of an object may include the type and location of the object.

The processor 150 may determine the type of an object based on the resonance frequency of a vibrating vibrator of the sound sensor 110 (Operation S410). Each object has a unique sound. Because a sound pattern includes a frequency band, the sound sensor 110 may output an electrical signal corresponding to an input sound. In the sound sensor 110, a vibrator having a resonance frequency included in the frequency of a sound may vibrate to output an electrical signal (for example, a voltage), and a vibrator having a resonance frequency not included in the frequency of the sound may not output an electrical signal. Thus, a signal output from the sound sensor 110 may include information on the frequency band of the sound, that is, the resonance frequency of a vibrator that resonates. The processor 150 may obtain a sound pattern based on an electrical signal subdivided by frequency received from the sound sensor 110 and determine the type of the sound by comparing the sound pattern to an object template.

The processor 150 may determine the direction of the object based on the direction of a vibrating vibrator of the sound sensor 110 (Operation S420). The processor 150 may include a plurality of vibrators having the same resonance frequency. Even if the vibrators have the same resonance frequency, the output intensities of the vibrators may be different depending on a direction in which a sound is input. The direction of a vibrator outputting the largest electric signal among the vibrators having the same resonance frequency may be determined to be the direction of the object.

The processor 150 may determine a distance to the object based on the output intensity of a vibrator (Operation S430). The memory 140 may store the intensity of each object template by distance. The processor 150 may determine the distance to the object by comparing the intensity of a sound pattern determining the type of the object to the intensity of the object template by distance.

In addition to the sound sensor 110, various sensors such as a radar, a lidar, and a camera are mounted on the vehicle 10. The Radar, the lidar, and the camera may be used to recognize an external environment in close proximity to the vehicle. The sound sensor 110 may recognize only objects that are not recognized by other sensors.

Figure 12:
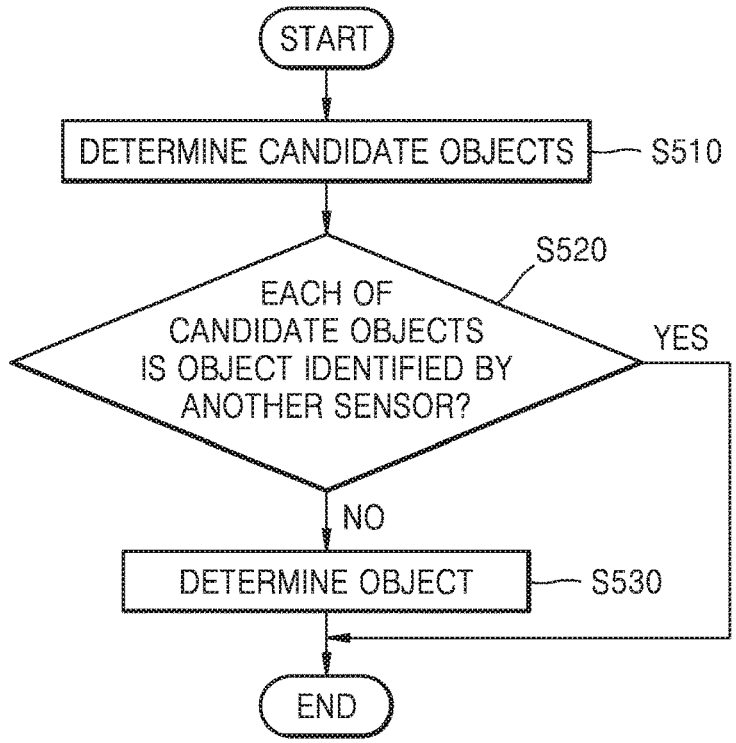
FIG. 12 is a flowchart illustrating a method of recognizing an object that is not recognized by another sensor in a vehicle, according to embodiments.

FIG. 12 is a flowchart illustrating a method of recognizing an object that is not recognized by another sensor in a vehicle, according to embodiments.

The processor 150 may determine candidate objects by using results received from the sound sensor 110 (Operation S510). A method of determining the candidate objects may be the same as the object identification method mentioned with reference to FIG. 10. That is, a sound pattern may be generated using the results received from the sound sensors 110, and then the sound pattern may be compared to a sound template to identify objects included in the sound pattern.

The processor 150 determines whether each of the candidate objects is an object identified by another sensor mounted on the vehicle (Operation S520). In addition, the processor 150 may determine a candidate object, which is not an object identified by another sensor, among the candidate objects, as a valid object (Operation S530). An object identified by an optical sensor included in a camera or a lidar may already be used to control vehicle driving. A signal processing load of the vehicle driving control apparatus 100 may be reduced by determining the type, distance, and direction of an object not identified by another sensor. In addition, a sound generated in an object identified by another sensor may also be used as a source for vehicle driving and thus the driving of a vehicle may be controlled more precisely. Whether or not to identify an object identified by another sensor may be controlled by a user, an external environment, or the like.

The sound sensor 110 detects all existing sounds. However, some of the existing sounds may be noise (e.g., driving noise generated by a passing vehicle), and some of the existing sounds may be sounds that are effective for the driving of a vehicle. The vehicle driving control apparatus 100 may determine an effective sound based on the intensity of a sound.

Figure 13:
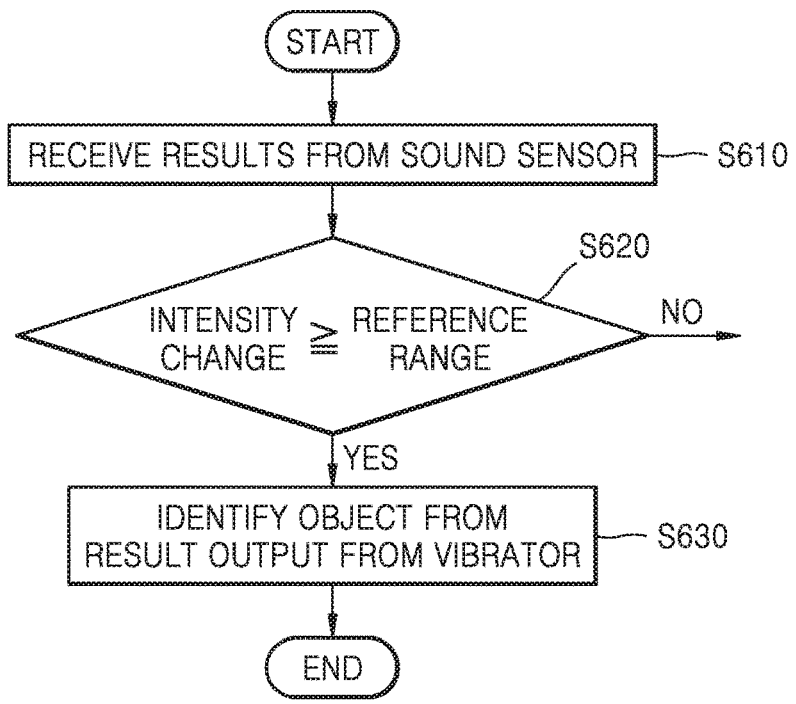
FIG. 13 is a flowchart illustrating a method of identifying a sound having a large intensity change as an object, according to embodiments.

FIG. 13 is a flowchart illustrating a method of identifying a sound having a large intensity change as an object, according to embodiments.

The processor 150 receives results from the sound sensor 110 (Operation S610). Each vibrator of the sound sensor 110 may output an electrical signal corresponding to an input sound. As each vibrator of the sound sensor 110 outputs an electrical signal corresponding to the input sound, the processor 150 may receive an electrical signal subdivided by frequency.

The processor 150 may determine a frequency, at which an intensity change is equal to or greater than a reference range, among frequencies of the electrical signal (Operation S620). When a collision occurs between vehicles in the surrounding environment of a vehicle, a loud sound due to the collision instantaneously occurs. Then, the magnitude of an electrical signal corresponding to a collision sound, output from the sound sensor 110, may instantaneously exceed the reference range.

The processor 150 may identify an object from a result output from a vibrator in which the intensity change is equal to or greater than the reference range (Operation S630). That is, the processor 150 may generate a sound pattern with an electrical signal subdivided by the frequency, at which the intensity change is equal to or greater than the reference range, among frequencies of the electrical signal received from the sound sensor 110, and may compare the sound pattern with a sound template to identify the object.

In FIG. 13, a sound having an intensity change that is equal to or greater than the reference range is determined to be an effective sound. However, the embodiments are not limited thereto. A sound having an intensity that is greater than a reference value may be determined to be an effective sound. For example, a siren sound of an ambulance may be a factor affecting the driving of a vehicle. However, when the ambulance is far away from the vehicle, or when the ambulance is in the opposite lane with respect to the vehicle, the siren sound of the ambulance does not affect the driving of the vehicle. Thus, when the siren sound gradually increases with time, or when the intensity of the siren sound is equal to or greater than a reference value, the processor 150 may determine the siren sound of the ambulance to be an effective sound. The processor 150 may then determine the direction of the ambulance and the distance between the ambulance and the vehicle and control the driving of the vehicle.

Figure 14A:
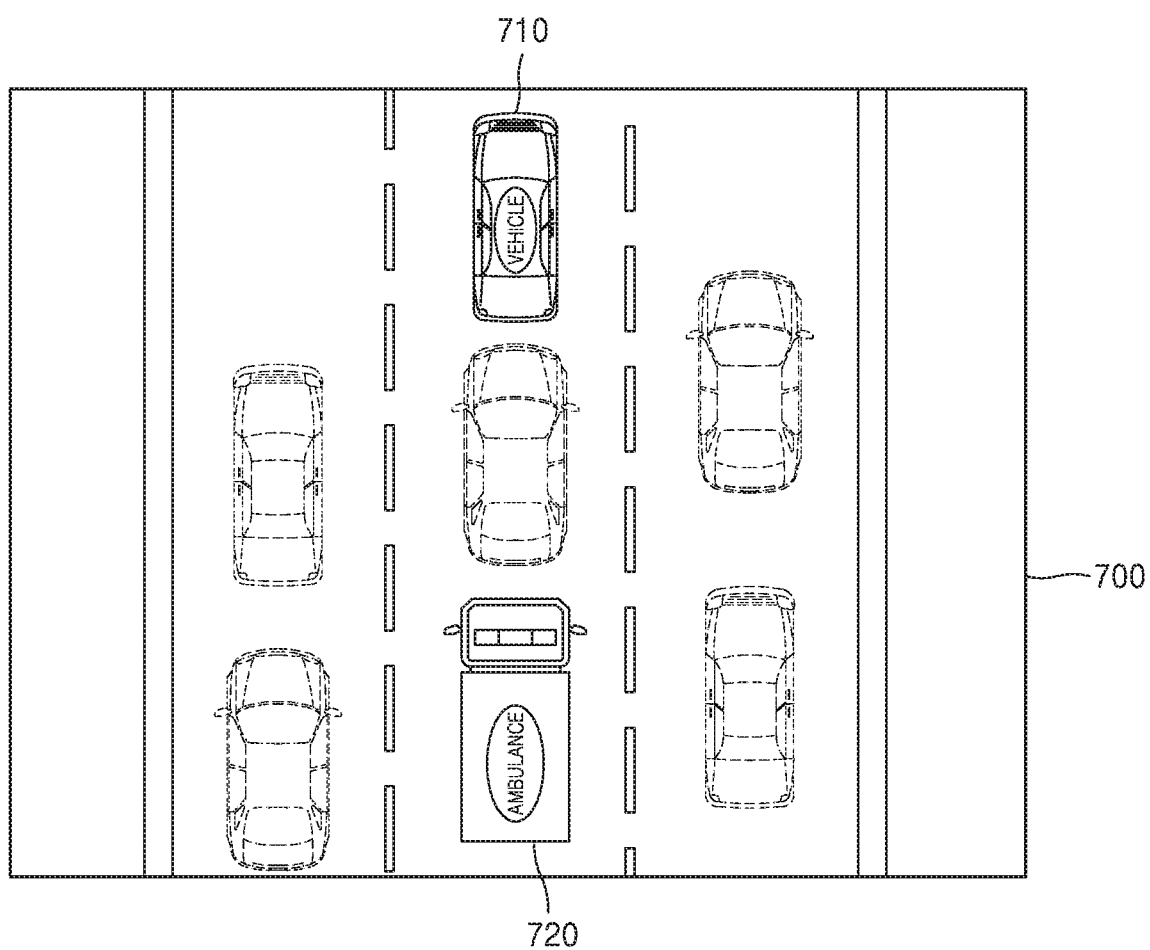
FIGS. 14A and 14B are reference diagrams illustrating a method of controlling the driving of a vehicle using a sound sensor, according to embodiments.
Figure 14B:
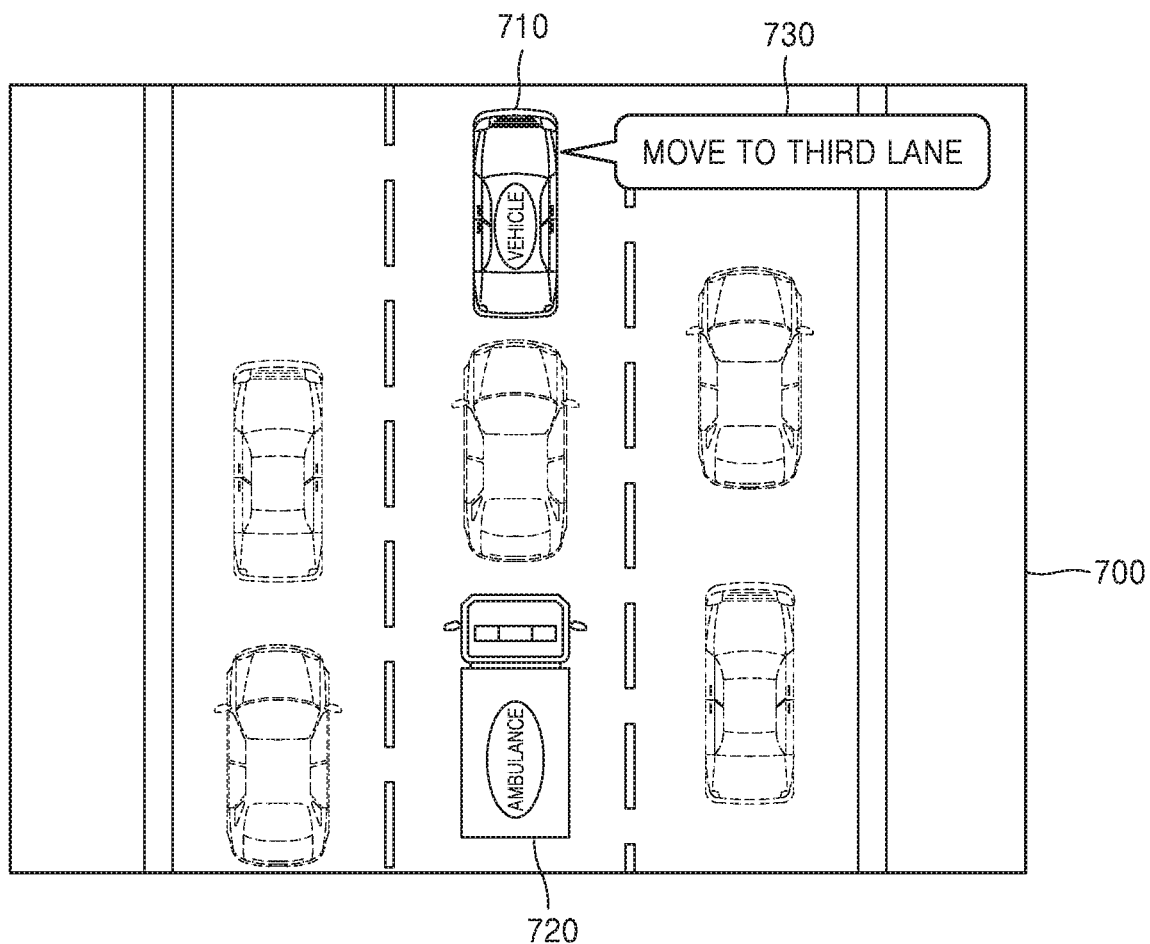

FIGS. 14A and 14B are reference diagrams illustrating a method of controlling the driving of a vehicle using the sound sensor 110, according to embodiments.

The vehicle driving control apparatus 100 may identify a siren sound based on a result received from the sound sensor 110. The vehicle driving control apparatus 100 may determine that an object generating the siren sound is an ambulance, based on the siren sound, and may determine the direction of the ambulance and the distance from the ambulance. The processor 150 may output information on the ambulance through the output interface 130.

For example, as shown in FIG. 14A, a display, which is a kind of the output interface 160, may display an image representing a surrounding environment. The location of a vehicle 710 and information 720 on an object identified by the sound sensor 110 may be shown on the image 700. That is, the display may display the type of the object (e.g., an ambulance), the direction of the object based on a vehicle, and the distance between the vehicle 710 and the object on the image 700.

As shown in FIG. 14B, the vehicle driving control apparatus 100 may provide driving information to a driver by outputting a driving control manual 730 according to a result obtained by the sound sensor 110.

Figure 15A:
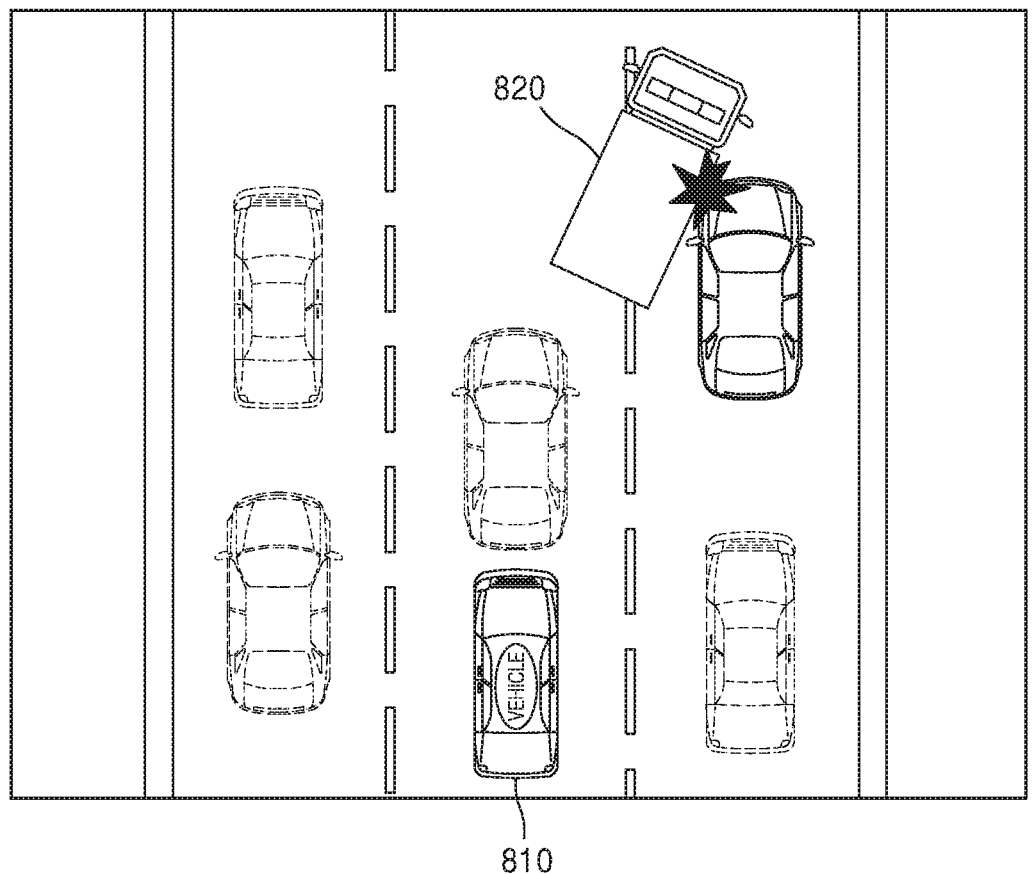
FIGS. 15A and 15B are reference diagrams illustrating a method of controlling the driving of a vehicle using a sound sensor, according to embodiments.
Figure 15B:
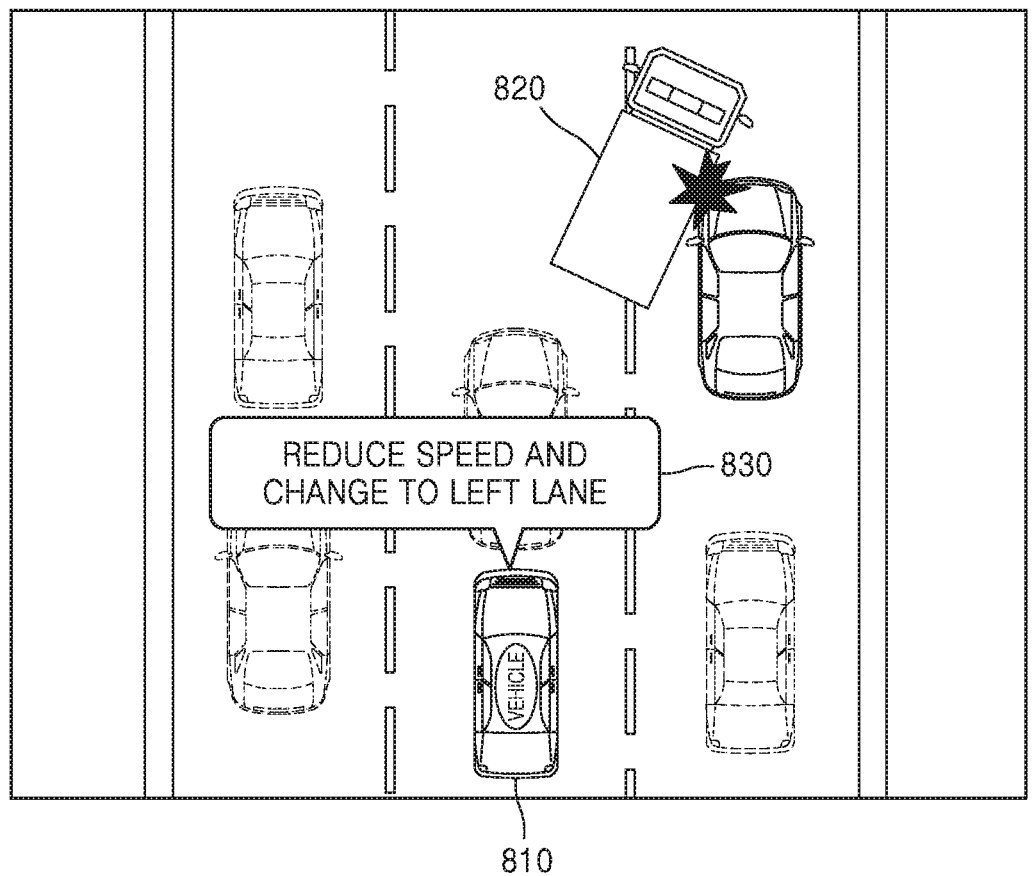

FIGS. 15A and 15B are reference diagrams illustrating a method of controlling the driving of a vehicle using the sound sensor 110, according to embodiments.

The sound sensor 110 may detect a siren sound. The vehicle driving control apparatus 100 may identify a siren sound based on a result received from the sound sensor 110. The vehicle driving control apparatus 100 may determine that an object generating the siren sound is a collision between vehicles, based on the siren sound, and may determine the point of collision or the like. The processor 150 may then output information on the object via a display.

For example, as shown in FIG. 15A, the display may display an image 800 representing a surrounding environment. The location of a vehicle 810 and information 820 on an object identified by the sound sensor 110 may be shown on the image 800. That is, an indicator indicating vehicle collision may be displayed at a vehicle collision occurrence point on the image 800. As shown in FIG. 15B, the vehicle driving control apparatus 100 may provide driving information to a driver by outputting a driving control manual 830 according to a result obtained by the sound sensor 110.

The sound sensor 110 may detect a sound outside the line of sight in real time, and thus may provide information on various external environments to the vehicle 810.

In FIG. 3, the vehicle driving control apparatus 100 includes the sound sensor 110, but is not limited thereto. The vehicle driving control apparatus 100 may be configured as a separate device from the sound sensor 110 and the driver 120.

Figure 16:
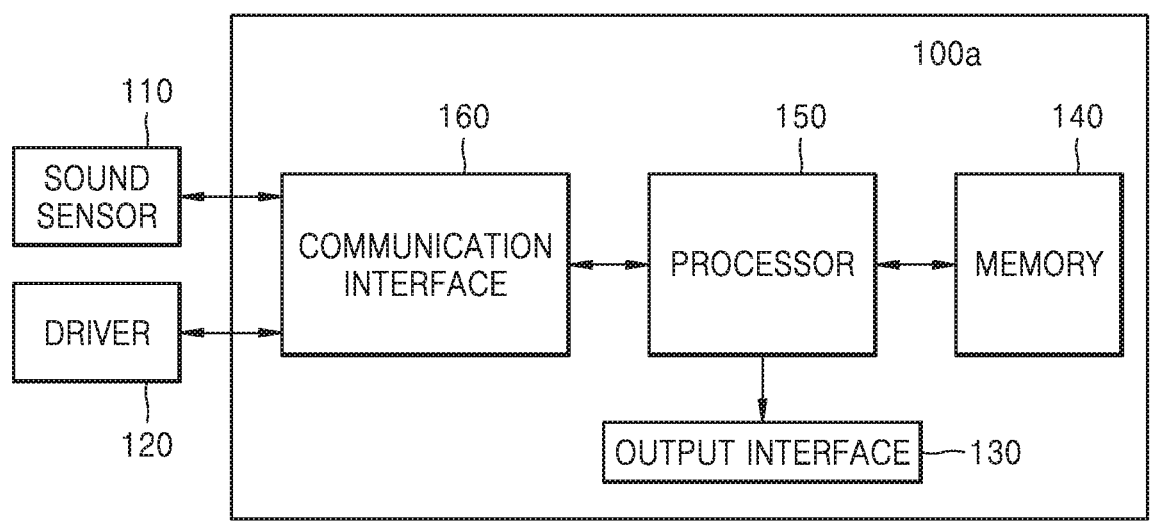
FIG. 16 is a block diagram of a vehicle driving control apparatus according to embodiments.

FIG. 16 is a block diagram of a vehicle driving control apparatus 100a according to embodiments.

Comparing FIG. 3 and FIG. 16, the vehicle driving control apparatus 100a may further include a communication interface 160 for communicating with a sound sensor 110 and a driver 120. The communication interface 160 may apply a result received from the sound sensor 110 to a processor 150 and may transmit a control instruction of the processor 150 to the driver 120. The communication interface 130 may include a short-range wireless communication interface, a mobile communication interface, and the like. The vehicle driving control apparatus 100a may be a cellular phone that is a separate electronic device from the vehicle 10. In addition, the vehicle driving control apparatus 100a may provide various pieces of information to an external output device through the communication interface 160 without including the output interface 130.

The disclosed embodiments may be implemented in a software program that includes instructions stored on a computer-readable storage medium.

The computer, which is an apparatus capable of calling stored instructions from a storage medium and operating according to the disclosed embodiments in accordance with the called instructions, may include an image transmission apparatus and an image reception apparatus according to the disclosed embodiments The computer-readable storage medium may be provided in the form of a non-transitory storage medium. Here, 'non-transitory' means that a storage medium does not include a signal and is tangible, but does not distinguish whether data is stored semi-permanently or temporarily on the storage medium.

Furthermore, an electronic device or method according to the disclosed embodiments may be included in and provided in a computer program product. The computer program product may be traded between a seller and a buyer as a product.

The computer program product may include a software program and a computer-readable storage medium having a software program stored thereon. For example, the computer program product may include a product (e.g., a downloadable app) in the form of a software program electronically distributed via a manufacturer of an electronic device or an electronic market (e.g., Google Play Store or App Store). For electronic distribution, at least a portion of the software program may be stored on a storage medium or may be temporarily generated. In this case, the storage medium may be a storage medium of a server of a manufacturer, a server of an electronic market, or a relay server for temporarily storing a software program.

In a system composed of a server and a terminal (e.g., the vehicle driving control apparatus 100 or a navigation server), the computer program product may include a storage medium of the server or a storage medium of the terminal. Alternatively, when there is a third device (e.g., a smart phone) in communication with the server or terminal, the computer program product may include a storage medium of the third device. Alternatively, the computer program product may include a software program itself transmitted from the server to the terminal or the third device, or transmitted from the third device to the terminal.

In this case, one of the server, the terminal, and the third device may execute the computer program product to perform the method according to the disclosed embodiments. Alternatively, two or more of the server, the terminal, and the third device may execute the computer program product to perform, in a distributed manner, the method according to the disclosed embodiments.

For example, a server (e.g., a cloud server or an artificial intelligence server) may execute a computer program product stored on the server to control a terminal communicating with the server to perform the method according to the disclosed embodiments.

As another example, a third device may execute a computer program product to control a terminal communicating with the third device to perform the method according to the disclosed embodiments. As a concrete example, the third apparatus may remotely control an image transmission apparatus or an image reception to transmit or receive a packed image.

When a third device executes a computer program product, the third device may download the computer program product from the server and execute the downloaded computer program product. Alternatively, the third device may execute a computer program product provided in a preloaded manner to perform the method according to the disclosed embodiments.

While the disclosure has been shown and described with reference to embodiments thereof, it will be understood by one of ordinary skill in the art that various changes in form and details may be made therein without departing from the spirit and scope of the disclosure as defined by the following claims.

What is claimed is:

1. A vehicle driving control apparatus comprising:
a communication interface configured to receive, from a sound sensor, a signal corresponding to sound that is generated in an external environment; and
a processor configured to:
identify a sound object generating the sound, by obtaining a type of the sound object and either one or both of a direction of the sound object and a distance from the sound object to a vehicle comprising the vehicle driving control apparatus, based on the received signal; and
control driving of the vehicle, based on the type of the sound object,
wherein the processor is further configured to identify the type of the sound object by:
receiving an electrical signal subdivided by frequency from the sound sensor, the electrical signal corresponding to a plurality of frequencies;
determining at least one frequency, at which an intensity change is equal to or greater than a reference range, among the plurality of frequencies;
generating a sound pattern corresponding to the at least one frequency, at which the intensity change is equal to or greater than the reference range; and
identifying the type of the object by comparing the sound pattern with a sound template.

2. The vehicle driving control apparatus of claim 1, wherein the processor is further configured to change either one or both of a driving route of the vehicle and a speed of the vehicle, based on the identified sound object.

3. The vehicle driving control apparatus of claim 1, wherein the processor is further configured to control the driving of the vehicle to prevent a collision between the vehicle and the identified sound object.

4. The vehicle driving control apparatus of claim 1, further comprising an output interface configured to output information of any one or any combination of the type of the sound object, the direction of the sound object, and the distance from the sound object to the vehicle.

5. The vehicle driving control apparatus of claim 4, wherein the output interface comprises a display configured to display an image related to the external environment, the image comprising the information of the type of the sound object.

6. The vehicle driving control apparatus of claim 5, wherein the display is further configured to display, on the displayed image, a relative position of the sound object with respect to the vehicle.

7. The vehicle driving control apparatus of claim 1, wherein the sound sensor is mounted on the vehicle.

8. The vehicle driving control apparatus of claim 1, wherein the sound sensor comprises a plurality of vibrators arranged in different directions and having different resonance bands, and
at least two among the plurality of vibrators are configured to vibrate in response to the sound.

9. The vehicle driving control apparatus of claim 8, wherein any one or any combination of the plurality of vibrators is arranged in parallel with a driving direction of the vehicle.

10. The vehicle driving control apparatus of claim 8, wherein the processor is further configured to:
obtain a frequency band of the sound, based on a resonance frequency of a vibrating vibrator among the at least two among the plurality of vibrators;
obtain the type of the sound object, based on the obtained frequency band of the sound;
obtain the direction of the sound object relative to the vehicle, based on a direction of the vibrating vibrator;
obtain and the distance from the sound object to the vehicle, based on an output intensity of the vibrating vibrator; and
obtain a change in the distance from the sound object to the vehicle, based on a time-dependent variation of the output intensity of the vibrating vibrator.

11. The vehicle driving control apparatus of claim 1, wherein the sound object is not identified by an optical sensor mounted on the vehicle.

12. The vehicle driving control apparatus of claim 11, wherein the sound object is in an area other than a line of sight of the optical sensor, in the external environment of the vehicle.

13. The vehicle driving control apparatus of claim 11, wherein the optical sensor comprises an image sensor.

14. The vehicle driving control apparatus of claim 11, wherein the processor is further configured to:
   obtain one or more candidate sound objects potentially generating the sound, based on a result that is output from the sound sensor; and
   identify, as the sound object, one among the one or more candidate sound objects that is not identified by the optical sensor.

15. A method of controlling driving of a vehicle, the method comprising:
   receiving, from a sound sensor, a signal corresponding to sound that is generated in an external environment;
   identifying a sound object generating the sound, by obtaining a type of the sound object and either one or both of a direction of the sound object and a distance from the sound object to the vehicle, based on the received signal; and
   controlling driving of the vehicle, based on the type of the sound object,
   wherein the type of the sound object is identified by:
      receiving an electrical signal subdivided by frequency from the sound sensor, the electrical signal corresponding to a plurality of frequencies, and
      determining at least one frequency, at which an intensity change is equal to or greater than a reference range, among the plurality of frequencies;
      generating a sound pattern corresponding to the at least one frequency, at which the intensity change is equal to or greater than the reference range; and
      identifying the type of the object by comparing the sound pattern with a sound template.

16. The method of claim 15, wherein the controlling of the driving of the vehicle comprises changing any one or any combination of a driving route of the vehicle and a speed of the vehicle, based on the identified sound object.

17. The method of claim 15, wherein the controlling of the driving of the vehicle comprises controlling the driving of the vehicle such that the vehicle and the identified sound object do not collide with each other.

18. The method of claim 15, further comprising outputting information of any one or any combination of the type of the sound object, the direction of the sound object, and the distance from the sound object to the vehicle.

19. The method of claim 18, wherein the outputting comprises displaying an image related to the external environment, the image comprising the information of the type of the sound object.

20. The method of claim 15, wherein the sound object is not identified by an optical sensor mounted on the vehicle.

21. The method of claim 20, wherein the identifying of the sound object comprises:
   obtaining one or more candidate sound objects potentially generating the sound, based on a result that is output from the sound sensor; and
   identifying, as the sound object, one among the one or more candidate sound objects that is not identified by the optical sensor.

22. The method of claim 15, wherein the sound sensor is mounted on the vehicle and comprises a plurality of vibrators arranged in different directions and having different resonance bands, and
   at least two among the plurality of vibrators are configured to vibrate in response to the sound.

23. The method of claim 22, wherein the identifying of the sound object comprises:
   obtaining a frequency band of the sound, based on a resonance frequency of a vibrating vibrator among the at least two among the plurality of vibrators;
   obtaining the type of the sound object, based on the obtained frequency band of the sound;
   obtaining the direction of the sound object relative to the vehicle, based on a direction of the vibrating vibrator;
   obtaining the distance from the sound object to the vehicle, based on an output intensity of the vibrating vibrator; and
   obtaining a change in the distance from the sound object to the vehicle, based on a time-dependent variation of the output intensity of the vibrating vibrator.

24. A vehicle driving control apparatus of a vehicle, the vehicle driving control apparatus comprising:
   a sound sensor configured to obtain a signal corresponding to sound that is generated by a sound object in an external environment; and
   a processor configured to:
   obtain a type of the sound object, a direction of the sound object and a distance between the sound object and the vehicle, based on the obtained signal; and
   control driving of the vehicle, based on the obtained type of the sound object, the obtained direction of the sound object and the obtained distance,
   wherein the processor is further configured to identify the type of the sound by:
      receiving an electrical signal subdivided by frequency from the sound sensor, the electrical signal corresponding to a plurality of frequencies, and
      determining at least one frequency, at which an intensity change is equal to or greater than a reference range, among the plurality of frequencies;
      generating a sound pattern corresponding to the at least one frequency, at which the intensity change is equal to or greater than the reference range; and
      identifying the type of the object by comparing the sound pattern with a sound template.

25. The vehicle driving control apparatus of claim 1, wherein the sound sensor comprises a plurality of vibrators, each configured to separately output an electrical signal corresponding to the sound, and
   wherein the processor is further configured to receive the signal, which is subdivided by frequency, based on the separately output electrical signal from each of the plurality of vibrators.

* * * * *